United States Patent [19]

Dietrich, Sr.

[11] Patent Number: 5,437,337
[45] Date of Patent: Aug. 1, 1995

[54] TILLAGE UNIT WITH REDUCED DISTURBANCE OF SURFACE RESIDUE AND SOIL

[75] Inventor: William J. Dietrich, Sr., Congerville, Ill.

[73] Assignee: DMI, Inc., Goodfield, Ill.

[21] Appl. No.: 96,560

[22] Filed: Jul. 22, 1993

[51] Int. Cl.6 .................... A01B 13/08; A01B 39/08
[52] U.S. Cl. ................... 172/196; 172/166; 172/700; 172/724; 172/730
[58] Field of Search ............. 172/196, 195, 166, 165, 172/181, 699, 700, 724, 725, 730

[56] References Cited

U.S. PATENT DOCUMENTS

| | | |
|---|---|---|
| 184,171 | 11/1876 | Porter . |
| 461,537 | 10/1891 | Lindgren . |
| 548,590 | 10/1895 | Poole ........................ 172/196 X |
| 555,804 | 3/1896 | Cummings . |
| 670,017 | 3/1901 | Gilman et al. . |
| 774,324 | 11/1904 | Hill et al. . |
| 1,073,984 | 9/1913 | Hartig . |
| 2,842,077 | 9/1953 | Morrison . |
| 2,904,119 | 9/1959 | Hunter . |
| 3,170,421 | 2/1965 | Norris et al. . |
| 3,799,079 | 3/1974 | Dietrich . |
| 3,967,564 | 7/1976 | Emling . |
| 4,245,706 | 1/1981 | Dietrich, Sr. . |
| 4,337,834 | 7/1982 | Weichel . |
| 4,403,662 | 9/1983 | Dietrich, Sr. . |
| 4,409,912 | 10/1983 | Koronka et al. . |
| 4,415,042 | 11/1983 | Cosson . |
| 4,538,689 | 9/1985 | Dietrich, Sr. . |
| 4,548,276 | 10/1985 | Linger . |
| 4,574,715 | 3/1986 | Dietrich, Sr. et al. . |
| 4,618,006 | 10/1986 | Cosson . |
| 4,699,220 | 10/1987 | Strohm . |
| 4,974,681 | 12/1990 | Symonds ................. 172/196 X |

FOREIGN PATENT DOCUMENTS 2118411  11/1983  United Kingdom ............ 172/196

OTHER PUBLICATIONS

AcraPlant brochure "Acratill" Systems, VPS 2000 Variable Profile Subsoiler dated 1992.
Binghma Brothers, Inc. brochure dated Sep. 1, 1991 for Paratill.
DMI brochure for "Ecolo-Til" 500 3, 5, & 7 shank conservation Yield-Till tools.
Howard Rotavator Company, Inc. brochure for Paraplow conservation tool.
Thurston Mfg. Co. "Blue Jet Sub-Tiller" brochure for Deep Conservation Tillage II dated Aug. 1986.
Tye Company "Pulltype Paratills" brochure dated Dec. 1990.
Unverferth Mfg. brochure for Rawson Zone-Builder dated 1992.

Primary Examiner—David H. Corbin
Assistant Examiner—Christopher J. Novosad
Attorney, Agent, or Firm—Emrich & Dithmar

[57] ABSTRACT

A conservation tillage unit includes a coulter and a plow having a shank, a point and a pair of wings mounted slightly forwardly of the shank. The unit fractures the soil at ground speeds up to seven miles per hour without throwing the surface soil and residue to the side and while leaving a reduced furrow behind the shank.

6 Claims, 2 Drawing Sheets

TILLAGE UNIT WITH REDUCED DISTURBANCE OF SURFACE RESIDUE AND SOIL

FIELD OF THE INVENTION

The present invention relates to agricultural tillage apparatus; and more particularly, it relates to an improved tillage unit which fractures and loosens soil while reducing the disturbance of the surface soil and residue.

BACKGROUND OF THE INVENTION

It has for years been recognized that soil erosion occurs as a result of tilling the soil. Yet, some tillage is highly desirable to increase the retention and absorption of water for the crop to increase crop yield.

Farming practices in those areas where the soil undergoes greater erosion have changed substantially over the last few decades. Very little, if any, moldboard plowing is done in these areas. Chisel plows have become popular, particularly over moldboard plows, because they leave more residue on the surface which prevents runoff of surface soil. Mold-board plows turn the soil, burying the residue. Many farmers have shifted to crop techniques such as minimum tillage (or "direct seeding" as it is sometimes referred to) in order to reduce soil erosion.

In an effort to reduce erosion, it has become desirable to leave as much of the previous crop residue on the soil surface as possible, consistent with the farmer's desire to perform some tillage to increase moisture absorption and retention. Residue on the surface not only holds the soil, but also increases moisture retention. This is particularly important in certain fields which carry the "H.E.L." designation of the U.S. Department of Agriculture (for "highly erodible land").

The desire to leave crop residue in place on the surface of the soil has been made more difficult by the use of tractors capable of conducting tillage operations at ground speeds of up to seven miles per hour. The shank of a typical chisel plow currently available commercially has a thickness of about an inch and a quarter or greater. Because of the thickness, the leading edge of the shank is formed into a tapered wedge to facilitate parting of the soil. The disadvantage of this type of shank is that at ground speeds greater than about two to three miles per hour, the soil and residue at the surface flow around the shank and is displaced laterally, leaving a furrow behind the shank. As it rains, the water gathers in these furrows and the furrows become rivulets. The flowing water carries with it the exposed surface soil in the furrows, thereby creating erosion. At higher speeds, the furrow may be 3–4 inches wide and free of any substantial amount of residue that would help prevent erosion.

There are other disadvantages to some current "state of the art" chisel plows. In chisel plows having parabolic shanks, as distinguished from the flat, rigid shanks of the present invention, the lifting action of the shank increases the depth and width of the furrow formed, and this increases soil erosion. Moreover, designs of current use impact the soil in an effort to pulverize as much of the soil as possible in hopes of increasing moisture retention. However, particularly possible at speeds which many farmers normally operate, the effect is to create more fine particles, rather than larger clods; and this tendency further increases erosion because the "fines" are more easily washed away in heavier downpours.

SUMMARY OF THE INVENTION

Thus, the present invention is intended to permit a farmer to till the soil at a depth of about eight to twelve or more inches and at speeds of up to seven miles per hour while leaving only a very narrow furrow and without clearing surface residue in its path and while reducing the soil "fines" that are produced, even at high speeds.

The present invention is a tillage unit which includes a coulter assembly followed by a novel chisel plow. The coulter is mounted in a leading position on the implement frame. The implement, of course, is drawn by a tractor. A number of similar tillage units, each including a coulter and a plow are mounted at desired lateral spacings along the frame, as with conventional tillage implements.

Behind the coulter, and closely associated with it, is the chisel plow shank which is also mounted to the frame. The shank of the chisel plow is aligned with the coulter and follows directly behind it.

The chisel shank includes a generally vertical bar having a width less than approximately ¾ of a inch. A plow point is mounted to the bottom of the shank and extends forwardly to a location beneath the coulter. The tip of the plow point includes an upper cutting edge which engages the soil and faces the edge of the coulter beneath the soil. That is, the cutting edge of the plow point is located directly beneath the cutting edge of the coulter travelling beneath the surface of the soil. These two cutting edges cooperate with each other such that at tractor speeds in the range of approximately 2–7 miles per hour, they form a generally vertical soil parting plane or fracture zone.

Behind the soil-engaging upper cutting edge of the point, and ahead of the shank, there are mounted left and right lift wings. These wings extend from the plow point laterally outwardly, downwardly and slightly rearwardly. The wings travel in the location just behind and near the bottom of the soil fracture zone, between the plow point and the coulter. The wings act further to fracture and loosen the soil laterally of the shank, and in front of the shank-that is, between the shank and the coulter. The soil being loosened is lifted slightly by the wings and the plow point, but it is not disturbed in the nature of a moldboard plow which lifts, rolls and displaces the soil. Nor is the soil pulverized or disturbed in the sense of more conventional chisel plows wherein the soil is lifted and thrown laterally by the wings in a rolling, covering motion.

The desirable soil loosening effect of the present invention is caused, at least in part, by the close proximity and cooperation of the cutting edges of the point and the coulter as well as the relatively thin width of the plow point. In addition, the location of the wings on the plow point in front of the shank and the narrow lateral extension of the wings reduce the interaction between the wings and the plow shank, thereby further reducing dislocation of the surface soil. This reduces pulverizing the soil to a loose fine condition that would erode easily.

Thus, by the time the shank traverses the soil, there is a reduced effect on the soil because the shank travels in the slot formed by the coulter at the upper level, and at the lower levels, it travels in the fracture plane of parted and loosened soil created by the cooperative action between the coulter, plow point and wings at lower depths. The thinness of the shank and point, and the cooperative action between the point, wings and coulter reduce the impact of the shank on the soil near the surface of the soil, thereby reducing the width and depth of the furrow formed by the shank and also reducing the disturbance of the soil at the surface as well as any residue left in the soil near the surface.

Other features and advantages of the present invention will be apparent to persons skilled in the art from the following detailed description of a preferred embodiment accompanied by the drawing, wherein like reference numerals will refer to similar parts in the various views.

DETAILED DESCRIPTION OF A PREFERRED EMBODIMENT

Figure 1:
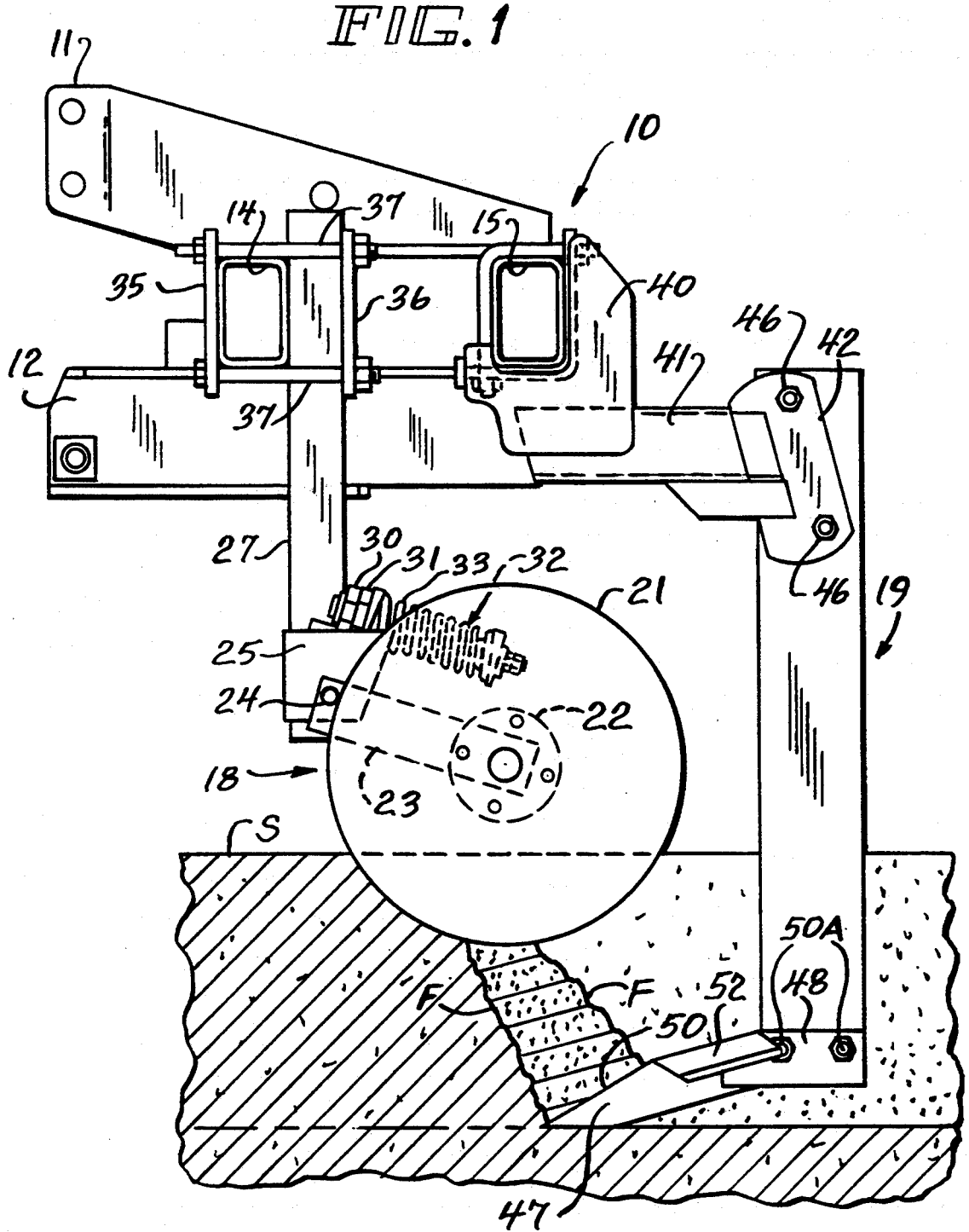
FIG. 1 is a side elevation view of a tillage unit incorporating the present invention, with the direction of travel being toward the left when viewed in the drawing.

Turning then to the drawing, reference numeral 10 generally designates an implement frame. In the illustrated embodiment, the implement is adapted to be mounted to the three-point hitch of a agricultural tractor—that is, the frame is cantilevered to the tractor hitch by means of an upper mounting bracket 11 and two lower mounting brackets, the left one being seen in FIG. 1 and designated by reference numeral 12.

For larger widths, the implement may be mounted to a tractor drawbar and supported by its own wheels. As persons skilled in the art will appreciate, the present invention will function equally effectively in either a cantilevered implement or a drawn implement having its own support wheels.

Turning now to the implement frame in more detail, it includes a forward transverse mounting bar 14 and a similar rear transverse mounting bar 15. The forward and rear mounting bars 14, 15 are connected together by transverse members to form a rigid frame or "toolbar" as it is sometimes referred to. In this context, the terms "frame" and "toolbar" are interchangeable and refer to implement frames of either the cantilevered type or the drawn type.

Figure 2:
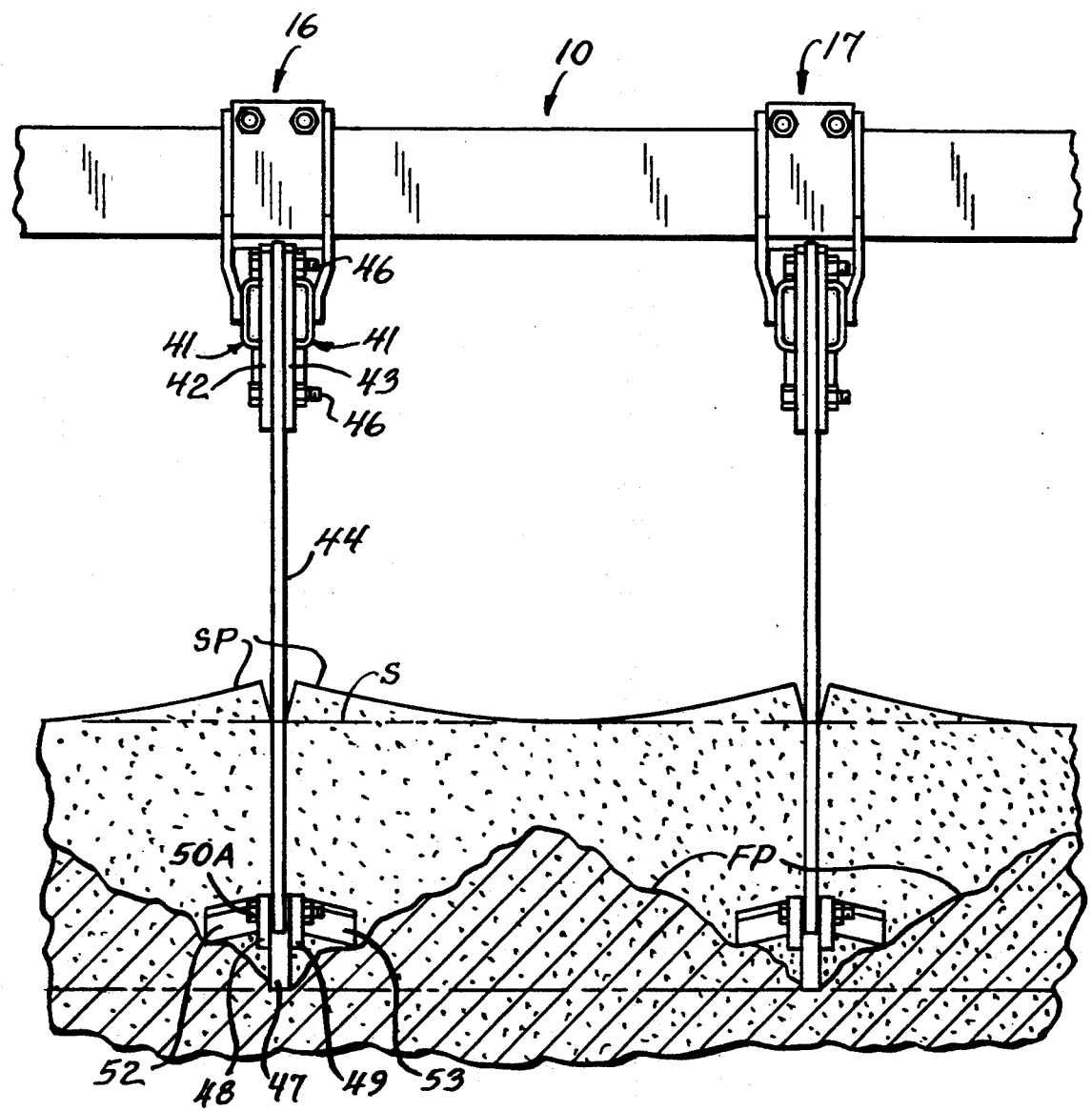
FIG. 2 is a rear view of the apparatus of FIG. 1, with the forward coulter assembly omitted and showing, in idealized form, the profile of the soil surface after plowing, and the profile of the loosened and untilled soil sections.

The present invention contemplates that a number of individual tillage units, each including a coulter and chisel plow, be mounted at locations spaced laterally along the implement frame. Referring to FIG. 2, one such tillage unit is generally designated 16, and a second one is designated 17, the unit 16 being on the left side of the unit 17. The spacing of the units may be adjusted, and the width of the implement in the use position may be typically in the range of 10 feet to a width up to 30 feet, if desired. A description of one of the tillage units will be sufficient for those skilled in the art to understand the invention because all of the tillage units used on the frame may be identical.

Referring now to FIG. 1, each tillage unit includes a coulter assembly 18 and a novel chisel plow 19 mounted behind an associated coulter assembly. Referring first to the coulter assembly 18, it includes a coulter blade 21 conventionally mounted by means of hub shown in phantom at 22 to a support arm 23. The support arm 23 is pivotally mounted by means of a shaft 24 to an angle bracket 25, the forward portion of which is mounted to a vertical mounting bar 27. The pin 24 is also journalled in the bar 27, and it has welded to it a plate 30. A spring seat plate 31 is welded between the bracket 25 and the vertical mounting bar 27 so that it is fixed. A coil spring assembly generally designated 32 and including a spring 33 is conventionally mounted to force the movable plate 30 against the fixed plate 31, thereby urging the coulter to its lowered position of normal use.

As the coulter encounters an obstruction, the mounting arm 23 is permitted to rotate counterclockwise with the shaft 24, thereby rotating the movable plate 30 in the same direction and compressing the spring 33. The spring 33 thus provides a restoring force for the coulter blade 21 to resume its normal use depth.

The vertical mounting bar 27 is mounted to the forward tubular frame member 14 by means of forward and rear plates 35, 36, mounting bolts 37 and nuts, as seen.

Turning now to the chisel plow, a bracket 40 is bolted to the rear tubular frame member 15. A rear extension 41 is mounted to the lower portion of the bracket 40; and first and second side plates 42, 43 (FIG. 2) are welded to the extension 41. A shank 44 is secured between the side plates 42, 43 by means of bolts 46.

As seen by comparing FIGS. 1 and 2, the shank 44 is formed of thin flat stock, having a width preferably about 9/16 in., and less than ¾ in. However, it has a substantial fore-to-aft dimension for strength. The shank 44 is aligned with the coulter blade 21 such that the shank is centered on the blade and is located in the slit cut by the coulter 21.

At the bottom of the shank 44, a plow point 47 is mounted by means of side plates 48, 49 and bolts 50. The width of the point 48 may be one inch. As best seen in FIG. 1, the plow point 47 includes an inclined upper surface 50 (sometimes referred to as the "cutting" edge) which faces the lowermost section of the coulter 21 which is located beneath the soil. Just rearward of the upper cutting surface 50 of the plow point 47 there are located first and second wings 52, 53. These wings are sloped slightly downwardly and to the side, and they are also extended toward the rear as seen in FIG. 1 so as to provide a slight lifting force on the soil that is encountered by the upper surfaces of the wings.

Each of the wings may have a width in the range of approximately 3 to 4 inches, a fore-to-aft length in the range of approximately 5 to 7 inches and angle down in the forward direction at approximately 15° relative to the horizontal with the outboard edge of each wing slightly lowered.

The operation of the tillage unit described above will now be discussed. However, it will be appreciated that what is given below is an idealized account of the operation and that the actual operation will vary under the real, changing conditions in the field. Moreover, the operation will vary somewhat depending upon soil conditions such as the moisture content, as well as with the characteristics of different soils. However, the overall intent of the design is as follows.

The coulter is set to operate at a depth of approximately three to five inches. That is, the lowest edge of the coulter beneath the idealized horizontal surface of the soil, designated by S in FIG. 1 is approximately 3–5 inches below the soil surface S. The coulter 21, plow shank 44 and plow point 47 are substantially in the same vertical plane. That is, each of these elements is thin enough to be considered, idealized, as a two-dimensional element. The upper, sloped cutting edge 50 of the plow point 47 creates a force on the soil, as the shank is pulled forwardly (that is, to the left in FIG. 1), and the spacing of the cutting edge 50 from the lowest edge of the coulter 21 is such that the two elements cooperate to provide a parting of the soil diagrammatically illustrated in the zone defined by the fracture lines F. This may be referred to as the fracture zone or parting plane. That is, there is no substantial displacement of the soil in the fracture zone between the edge 50 and the lower edge of the coulter 21 when the soil in the zone is broken. This soil-breaking action reduces the drag on the shank 44 and permits the shank to be pulled through the soil without impacting solid soil near the surface, which would increase the tendency to throw soil out of the furrow formed by the shank and thus leave a deeper and wider furrow. The formation of the fracture zone is particularly important at higher ground speeds over four miles per hour.

After the soil is fractured, the wings 52, 53, with their slight lifting motion and narrow lateral extension, raise the soil on either side of the fracture zone and lift the soil slightly without displacing it laterally to any substantial extent. Ideally, the surface of the soil and remnant residue are left substantially intact. Moreover, the facing wings of adjacent tillage units (i.e., the left wing of the unit on the right and the right wing of the unit on the left) cooperate to fracture and loosen the soil in the idealized profile designated FP in FIG. 2 lifting the soil with a slight central trough, bending the adjacent cut soil edges upward to permit passage of the shank, and leaving the broken soil in larger clods rather than as fine particles.

The fact that the soil is fractured first and then lifted by the wings, together with the reduced engagement area of the wings, permits the soil to be loosened and the shank to pass without heaving the soil laterally. The thinness of the shank and tip, and their close association and alignment with the coulter further enable the tilled soil profile at the surface, as indicated particularly in the area designated SP, to be raised slightly above the normal horizontal surface of the soil designated by the chain line S with little or no disturbance of the surface. There is thus formed a very narrow groove behind the shank of the tillage unit, with minimal disturbance of residue on the surface due to the fact that the soil is not lifted and thrown laterally under the action of the wings, shank and tip, and because the coulter 21 cuts most of the residue before the shank 44 is pulled through the soil.

Having thus disclosed in detail a preferred embodiment of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

I claim:

1. An agricultural tillage implement adapted to be drawn by a tractor, comprising a frame; a plurality of tillage units mounted in laterally spaced relation on said frame, each tillage unit comprising, in combination, a coulter mounted to said frame for cutting a slot in the soil; and a chisel plow mounted to said frame behind said coulter and including a generally vertical shank having a width less than approximately ¾ inch mounted in alignment with said coulter, a plow point mounted to the bottom of said shank and extending forwardly of said shank beneath said coulter slot, said point having an upper, soil-cutting edge inclined upwardly and rearwardly from a leading portion and cooperating with the coulter slot to fracture soil in a zone above said point without substantially displacing the fractured soil; and a pair of wings having upper lift surfaces extending upwardly and rearwardly while extending downwardly and laterally of said point and having cutting edges located substantially entirely in front of the leading edge of said shank and adapted to lift the soil behind the fracture zone and to loosen said soil without throwing the soil to the side, and to part the soil before said shank enters said coulter slot, whereby said soil is loosened while leaving the surface profile substantially undisturbed and leaving only a narrow groove in the soil formed by said narrow shanks with reduced disturbance of surface residue.

2. Agricultural tillage apparatus mounted on a tractor drawn frame, comprising, in combination; a coulter mounted to said frame for cutting the soil; and a chisel plow mounted to said frame in alignment with said coulter, and including a generally vertical shank having a width of less than approximately three-quarters of an inch, and mounted directly behind said coulter, a plow point having a width approximately equal to said shank and mounted to the bottom of said shank and extending in front of the leading edge of said shank, said point having an upper cutting edge extending upwardly and rearwardly from the foremost portion thereof; and a pair of wings mounted to said plow in front of said shank and extending downwardly and outwardly therefrom and sloped upwardly from front to rear, the side-to-side extension of said wings being less than about four inches, whereby in operation at ground speed in the range of approximately 2 to 7 miles per hour the forward, upper cutting edge of said point cooperates with the slot formed by said coulter beneath the soil to part the intervening soil in a generally vertical fracture zone, and said wings lift and loosen the soil laterally in the fracture zone and on either side of said point and part the soil near the surface in front of said shank such that said shank is drawn through the fracture zone with reduced displacement of the fractured soil and with reduced disturbance of residue at the soil surface.

3. An agricultural tillage implement adapted to be drawn by a tractor, comprising a frame; a plurality of tillage units mounted in laterally spaced relation on said frame, each tillage unit comprising, in combination, a coulter mounted to said frame for cutting a slot in the soil; and a chisel plow mounted to said frame behind said coulter and including a generally vertical shank having a width less than approximately three-quarters of an inch mounted to run in said coulter slot, a plow point mounted to the bottom of said shank and extending forwardly of said shank to a location beneath said coulter slot, said point having an upper, soil-cutting edge extending upwardly and rearwardly from a leading portion and cooperating with the coulter slot to fracture soil in a zone above said point without substantially displacing the fractured soil, and a pair of wings each having a leading edge and an upper lift surface extending upwardly and rearwardly at a slope less than the slope of said cutting edge of said point, said wings extending downwardly and laterally of said point, said lift surfaces to further fracture soil located in front of the leading edge of said shank and adapted to lift the soil behind the fracture zone and to loosen said soil without throwing the soil to the side, and to part the soil before said shank enters said coulter slot, whereby said soil is loosened while leaving the surface profile substantially undisturbed and leaving only a narrow groove in the soil formed by said narrow shanks with reduced disturbance of surface residue.

4. The apparatus of claim 3 wherein the leading edges of said wings have center portions integral with an upper section of said cutting edge of said point to effect a smooth transition of said contact from said cutting edge of said point to the lift surfaces of said wings.

5. The apparatus of claim 4 wherein said wings are integral with said point and joined thereto in front of the leading edge of said shank.

6. Agricultural tillage apparatus mounted on a tractor drawn frame, comprising, in combination; a coulter mounted to said frame for cutting a slot in the soil; and a chisel plow mounted to said frame in alignment with said coulter, and including a generally vertical shank having a width of less than approximately three-quarters of an inch, and mounted in alignment with said coulter slot, a plow point mounted to the bottom of said shank and extending in front of the leading edge of said shank, said point having an upper cutting edge extending upwardly and rearwardly from the foremost portion thereof; and a pair of wings mounted to said plow in front of said shank and extending downwardly and outwardly therefrom and sloped upwardly from front to rear, the side-to-side extension of said wings being approximately four inches, whereby in operation at ground speed in the range of approximately 2 to 7 miles per hour the forward, upper cutting edge of said point cooperates with the slot formed by said coulter beneath the soil to part the intervening soil in a generally vertical fracture zone, and said wings lift and loosen the soil in the fracture zone and laterally on either side of said point and part the soil near the surface before said shank such that said shank is drawn through the fracture zone with reduced displacement of the fractured soil and with reduced disturbance of residue at the soil surface.

* * * * *